US010449472B2

(12) United States Patent
Kim et al.

(10) Patent No.: US 10,449,472 B2
(45) Date of Patent: Oct. 22, 2019

(54) CENTRIFUGAL FILTRATION APPARATUS INCLUDING STEREOSCOPIC FILTER

(71) Applicant: SHIN HEUNG PRECISION CO., LTD., Ulsan (KR)

(72) Inventors: Yong Keun Kim, Ulsan (KR); Tae Ja Kim, Ulsan (KR); Seok Jae Yang, Ulsan (KR)

(73) Assignee: Shin Heung Precision Co., Ltd., Ulsan (KR)

( * ) Notice: Subject to any disclaimer, the term of this patent is extended or adjusted under 35 U.S.C. 154(b) by 344 days.

(21) Appl. No.: 14/887,785

(22) Filed: Oct. 20, 2015

(65) Prior Publication Data

US 2017/0028323 A1 Feb. 2, 2017

(30) Foreign Application Priority Data

Jul. 29, 2015 (KR) .......................... 10-2015-0107095

(51) Int. Cl.
*B01D 33/00* (2006.01)
*B01D 33/06* (2006.01)
*B04B 5/00* (2006.01)
*B04B 7/16* (2006.01)

(52) U.S. Cl.
CPC ..... *B01D 33/0035* (2013.01); *B01D 33/0087* (2013.01); *B01D 33/06* (2013.01); *B04B 5/005* (2013.01); *B04B 7/16* (2013.01)

(58) Field of Classification Search
CPC ............ B01D 33/0087; B01D 33/0035; B01D 33/06; B04B 5/005; B04B 7/16
See application file for complete search history.

(56) References Cited

U.S. PATENT DOCUMENTS

| 4,530,764 A | * | 7/1985 | Thomas | ............... | B01D 29/073 |
| | | | | | 210/637 |
| 2004/0182774 A1 | * | 9/2004 | Hirokawa | ............. | B01D 63/10 |
| | | | | | 210/321.74 |
| 2013/0193058 A1 | * | 8/2013 | Kim | ....................... | B04B 5/005 |
| | | | | | 210/377 |

FOREIGN PATENT DOCUMENTS

| JP | 05-200222 A | | 8/1993 |
| JP | 2010-269210 A | | 12/2010 |
| KR | 20060004605 A | * | 1/2006 |
| KR | 10-2006-0018547 A | | 3/2006 |
| KR | 10-0671007 B1 | | 1/2007 |

(Continued)

OTHER PUBLICATIONS

Toshiba, Cyclone-type Solid-liquid Separator, Mar. 29, 2014.*

*Primary Examiner* — Bobby Ramdhanie
*Assistant Examiner* — Donovan Bui-Huynh
(74) *Attorney, Agent, or Firm* — Rabin & Berdo, P.C.

(57) ABSTRACT

Disclosed is a centrifugal filtration apparatus including a casing, a shaft, a stand tube, a rotor, and a stereoscopic filter. The shaft is vertically installed in the casing and guides a fluid to an upper end of the casing. The stand tube rotates about the shaft and sprays the fluid to the upper end of the casing. The rotor rotates along with the stand tube and forms a space in the casing to receive and filter the fluid sprayed from the stand tube. The stereoscopic filter includes a plate member and wire members. The plate member is rolled up around the stand tube and is installed in the rotor. The wire member is installed between layers of the plate member to secure a gap between the layers of the plate member and forms a filter layer to filter the fluid that flows between the layers of the plate member.

6 Claims, 7 Drawing Sheets

(56) References Cited

FOREIGN PATENT DOCUMENTS

KR  10-1003524 B1  12/2010
KR  10-1480923 B1  1/2015

* cited by examiner

CENTRIFUGAL FILTRATION APPARATUS INCLUDING STEREOSCOPIC FILTER

BACKGROUND OF THE INVENTION

Field of the Invention

The present invention relates to a centrifugal filtration apparatus used to filter out impurities in a fluid and, more particularly, to a centrifugal filtration apparatus including a stereoscopic filter that is installed in a rotor and disposed in a fluid channel to efficiently come into contact with impurities in a fluid, thereby increasing impurity removal efficiency.

Description of the Related Art

A typical centrifugal filtration apparatus is an apparatus to filter, purify, or thicken a mixture of elements that have different compositions or specific gravities using centrifugal force. It is generally used as a filter to remove impurities from a fluid.

Figure 1:
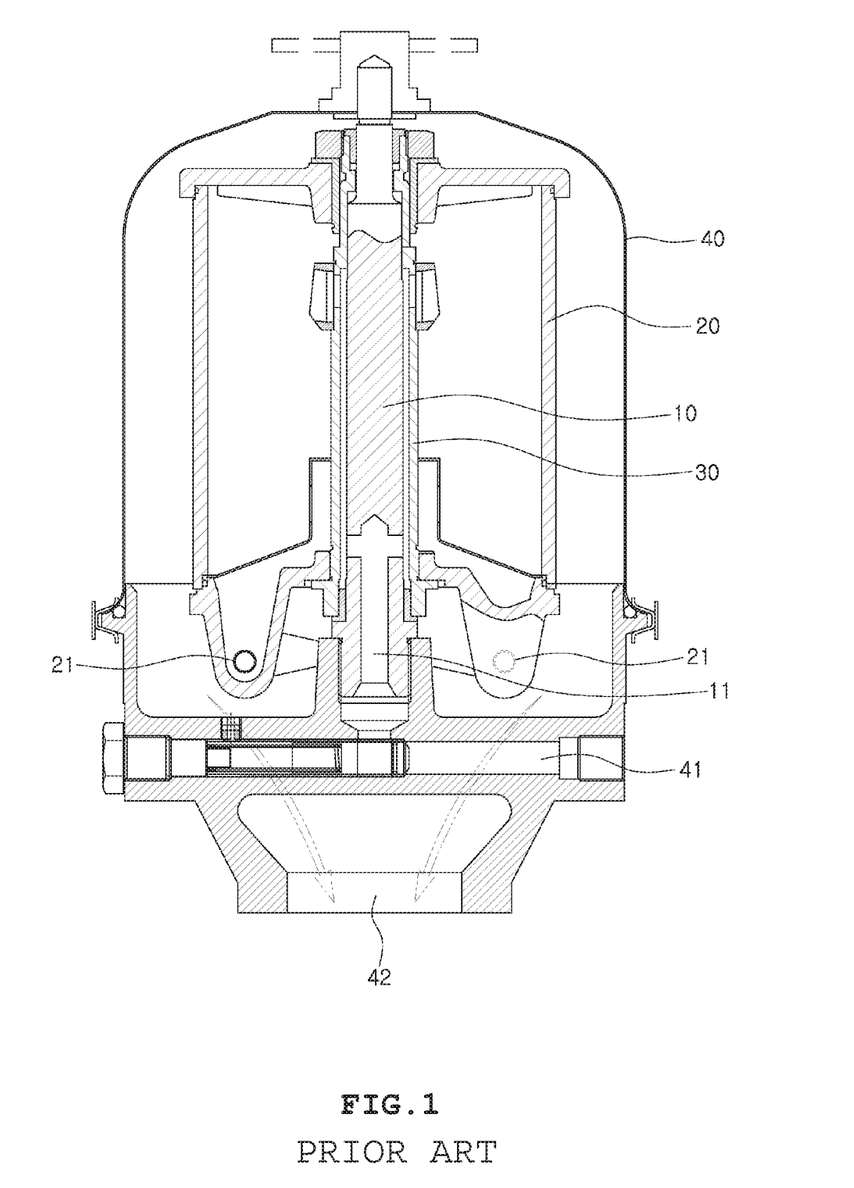
FIG. 1 is a cross-sectional view illustrating the construction of a conventional centrifugal filtration apparatus.

FIG. 1 is a cross-sectional view illustrating the construction of a conventional centrifugal filtration apparatus.

The centrifugal filtration apparatus of FIG. 1 is a centrifugal filtration apparatus that filters out impurities in a fluid (for example, lubricating oil) used for lubricating an engine.

The centrifugal filtration apparatus includes a shaft 10 having a fluid channel 11 therein through which a fluid passes, a rotor 20 that rotates about the shaft 10, a stand tube 30 that rotates about the shaft 10 along with the rotor 20 and sprays a fluid that is introduced through the shaft 10 into the rotor 20, and a casing 40 that has an inlet 41 and an outlet 42 and encases the rotor 20 therein.

The centrifugal filtration apparatus is supplied with a fluid by action of a pump (not shown) and filters the fluid before the fluid is supplied to an engine or other machinery.

Specifically, the rotor 20 is rotated at high speed due to reaction against spraying action of a fluid that is sprayed through a nozzle 21 formed in the rotor 20. Impurities in the fluid that is sprayed into the rotor 20 from the stand tube 30 are separated due to centrifugal force and to a difference in specific gravity between the impurities and the fluid. The separated impurities spatter and stick to a piece of paper (not shown) installed inside the rotor 20. In this way, impurities are removed.

The conventional centrifugal filtration apparatus has low filtration efficiency in removing fine particles having a size of 10 μm or less. This is because the influence of centrifugal force on fine particles having a size of 10 10 μm or less is negligible. Therefore such fine particles cannot reach a paper filter installed in the rotor 20 though centrifugal force. For this reason, it is difficult to remove particles having a size of 10 μm or less with a conventional centrifugal filtration apparatus.

In short, although conventional centrifugal filtration apparatuses have a high filtration capacity, they have a disadvantage of low removal efficiency for impurities having a size of 10 μm or less.

On the other hand, there are some filters that can pass only particles having a predetermined size or less, for example, 10 μm or less. These filters can easily filter out impurities with a size of 10 μm or less, but such filters generally have low filtration capacity. Besides, impurities that are filtered out by filters are likely to accumulate on the surface of the filters, which results in an increase in flow resistivity. This leads to the need of frequent filter replacement.

Documents of Related Art (Patent Document 1) Korean Patent No. 10-1003524 (published on Dec. 30, 2010)

SUMMARY OF THE INVENTION

Accordingly, the present invention has been made keeping in mind the above problems occurring in the related art, and the present invention is intended to propose a centrifugal filtration apparatus having a stereoscopic filter as a centrifugal filter in which the stereoscopic filter has a complex structure composed of wire members and plate members, thereby having improved impurity removal efficiency.

In order to achieve the above object, according to one aspect of the present invention, there is provided a centrifugal filtration apparatus including a stereoscopic filter, the apparatus including: a casing with an inlet and an outlet; a shaft that is vertically installed in the casing and guides a fluid that is introduced through the inlet to an upper end of the shaft; a stand tube that is installed to rotate about the shaft and sprays the fluid that is guided to the upper end of the casing through the shaft 12; a rotor that is installed in the casing to form a space to receive and filter the fluid sprayed from the stand tube while rotating along with the stand tube and that is provided with a nozzle through filtered fluid is sprayed into the casing; and a stereoscopic filter including a plate member and a plurality of wire members, the plate member including a plurality of layers distanced from each other, the plate member surrounding the stand tube and installed in the rotor, the wire members formed in a side surface of the plate member to secure a gap between the layers of the plate member, thereby allowing a fluid to flow through the gap, the wire members forming a filter layer to filter out impurities by coming into contact with the impurities in the fluid that flows between the layers of the plate member.

The plate member may be a plate member that is rolled up in the form of a scroll.

The plate member may include a plurality of plate members all having a cylinder shape and different sizes.

The plate member may be made of fabric in which warp and weft threads cross each other and is a porous medium having a plurality of pores.

The plate member may be formed to be parallel with the shaft.

The wire members may have a hook shape and be engaged with each other to form a filter layer having a plurality of filter meshes.

The wire members may have a ring shape and be coupled to each other to form a filter layer having a plurality of filter meshes.

The stereoscopic filter may take the form of rolled-up VELCRO™ fastener that has a hook surface or a loop surface.

The stereoscopic filter may be inserted between the rotor and the stand tube so as to rotate along with the rotor.

According to the present invention, the stereoscopic filter installed in the rotor increases the contact surface between a filter and impurities compared with conventional centrifugal filtration apparatuses. Therefore, the centrifugal filtration apparatus according to the present invention has improved impurity removal efficiency.

In addition, since the plate members and wire members that constitute the stereoscopic filter are uniformly dispersed in a region from the outside surface of the stand tube to the inside surface of the rotor, it is possible to remove impurities of fine particles that are less influenced by centrifugal force.

DETAILED DESCRIPTION OF THE INVENTION

The present invention will be described in detail below with reference to the accompanying drawings. Repeated descriptions and descriptions of known functions and configurations which have been deemed to make the gist of the present invention unnecessarily obscure will be omitted below.

Figure 2:
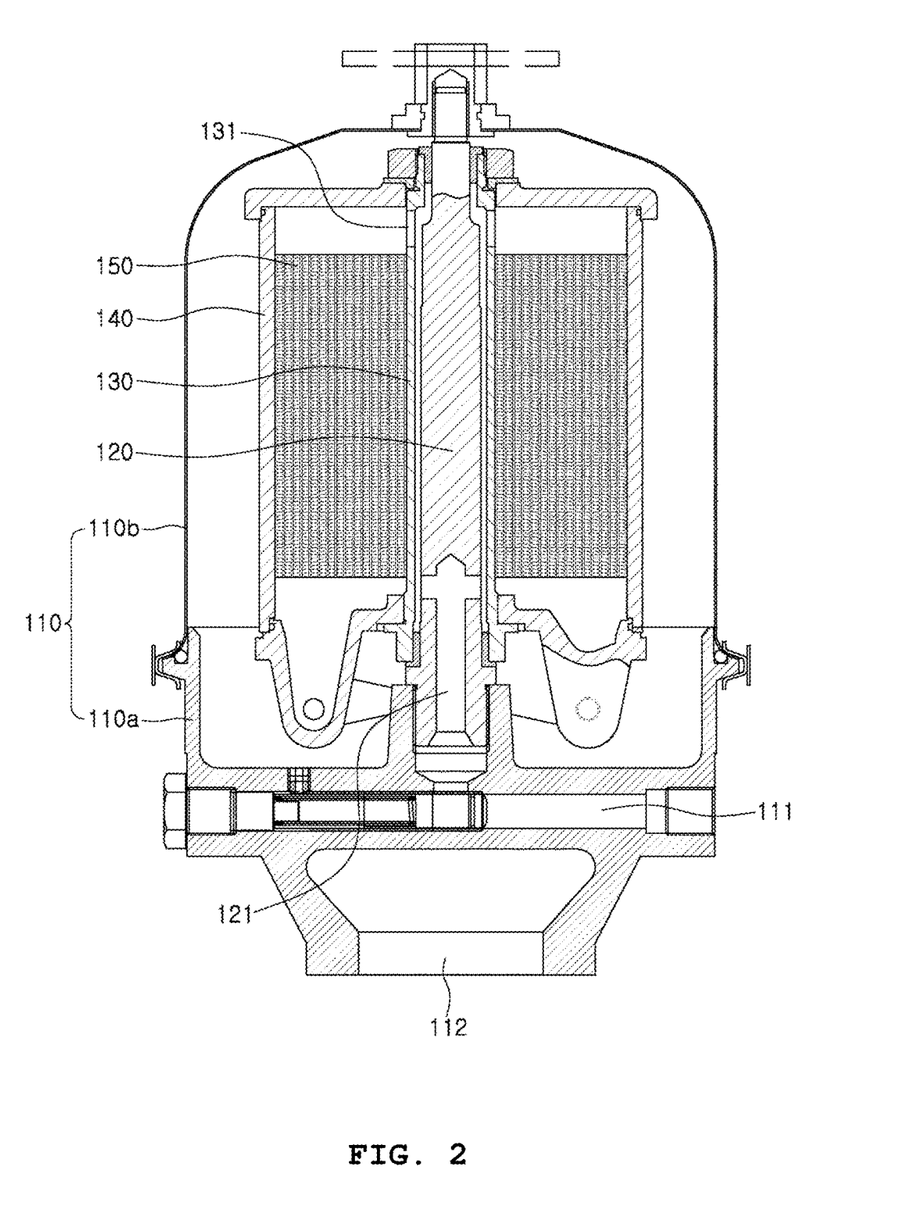
FIG. 2 is a cross-sectional view illustrating the construction of a centrifugal filtration apparatus according to one embodiment of the present invention.

FIG. 2 is a cross-sectional view illustrating the construction of a centrifugal filtration apparatus according to a first embodiment of the present invention.

The centrifugal filtration apparatus according to the first embodiment includes a casing 110, a shaft 120, a stand tube 130, a rotor 140, and a stereoscopic filter 150.

The casing 110 serves as the external structure of the centrifugal filtration apparatus and encases the shaft 120, the stand tube 130, and the rotor 140. The casing 110 includes a base 110a with an inlet 111 and an outlet 112, and a cover 110b having a cylindrical shape. The cover 110b has an open lower end that is combined with an upper end of the base 110a.

The shaft 120 is vertically installed and supports the stand tube 130 and the rotor 140 in a rotatable manner. A fluid is introduced into the casing 110 through the inlet 111. A fluid channel 121 is formed in the shaft 120 to guide the fluid up to the upper end of the casing 110.

The stand tube 130 rotates about the shaft 120 along with the rotor 140. The stand tube 130 has a plurality of holes 131 in an upper end portion thereof. The fluid introduced through the shaft 120 is sprayed into the rotor 130 through the holes 131.

The holes 131 are formed in the upper end portion of the stand tube 130 at a height where the fluid can be sprayed into the rotor 140.

The rotor 140 is installed in the casing 110 and rotates along with the stand tube 130. The rotor 140 forms a space in the casing 110, thereby receiving and filtering the fluid sprayed from the stand tube 130 therein. The rotor 140 has one or more nozzles 141 at a lower end thereof so that the filtered fluid can be sprayed into the casing 110 through the nozzle 141.

Conventional centrifugal filtration apparatuses filter out impurities with a paper filter installed on the inner surface of the rotor 140. However, the centrifugal filtration apparatus according to the present invention has the stereoscopic filter 150 in the rotor 140 to filter out impurities instead of the paper filter.

Figure 3:
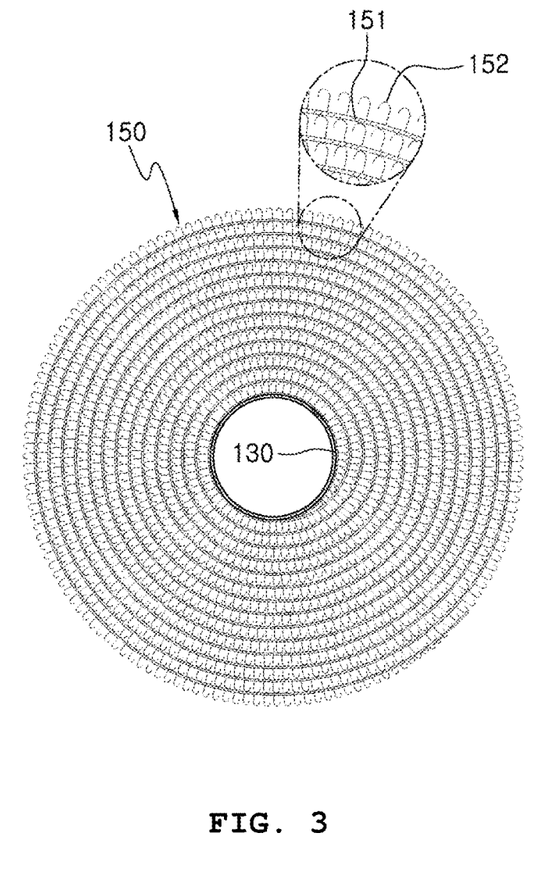
FIG. 3 is a plan view illustrating a filter member serving as a stereoscopic filter composed of one plate member, according to one embodiment of the present invention.
Figure 4:
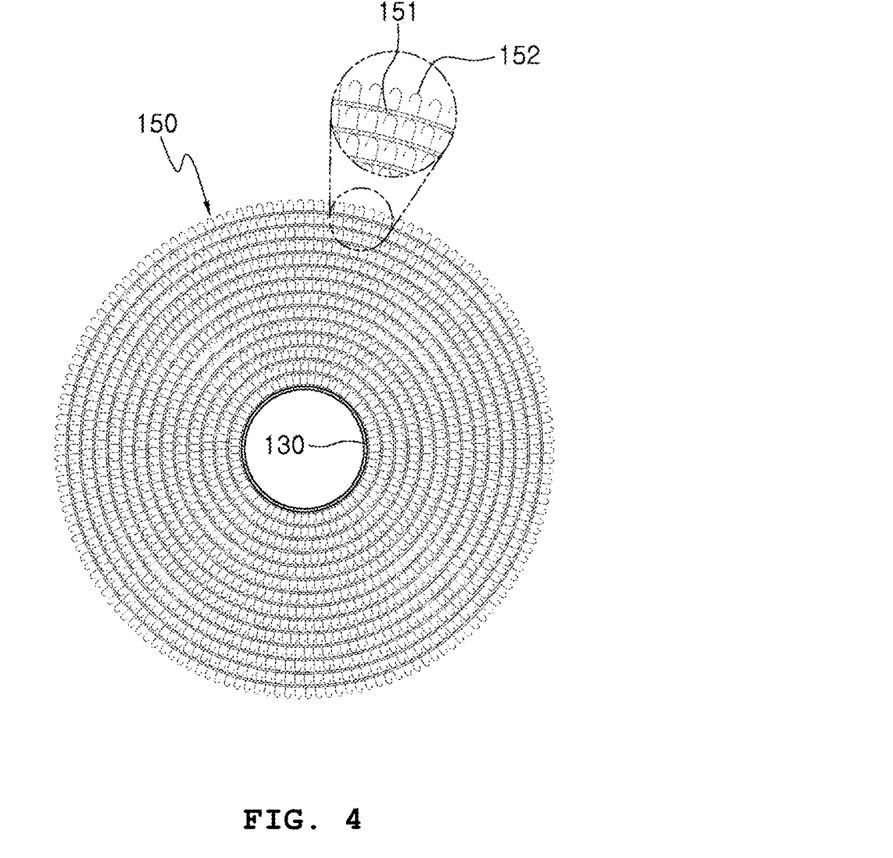
FIG. 4 is a plan view illustrating a stereoscopic filter composed of a plurality of plate members, according to another embodiment of the present invention.
Figure 5:
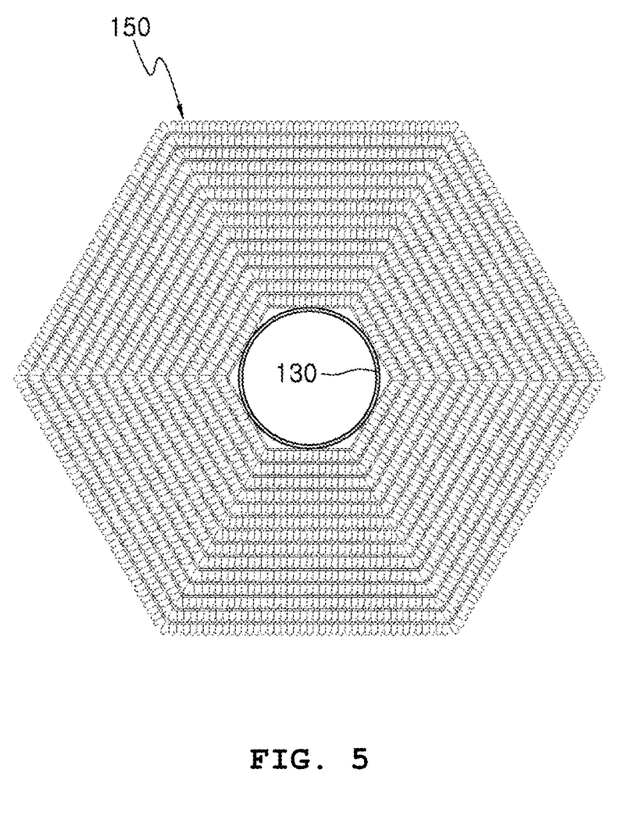
FIG. 5 is a plan view illustrating a stereoscopic filter including ring-shaped wires.
Figure 6:
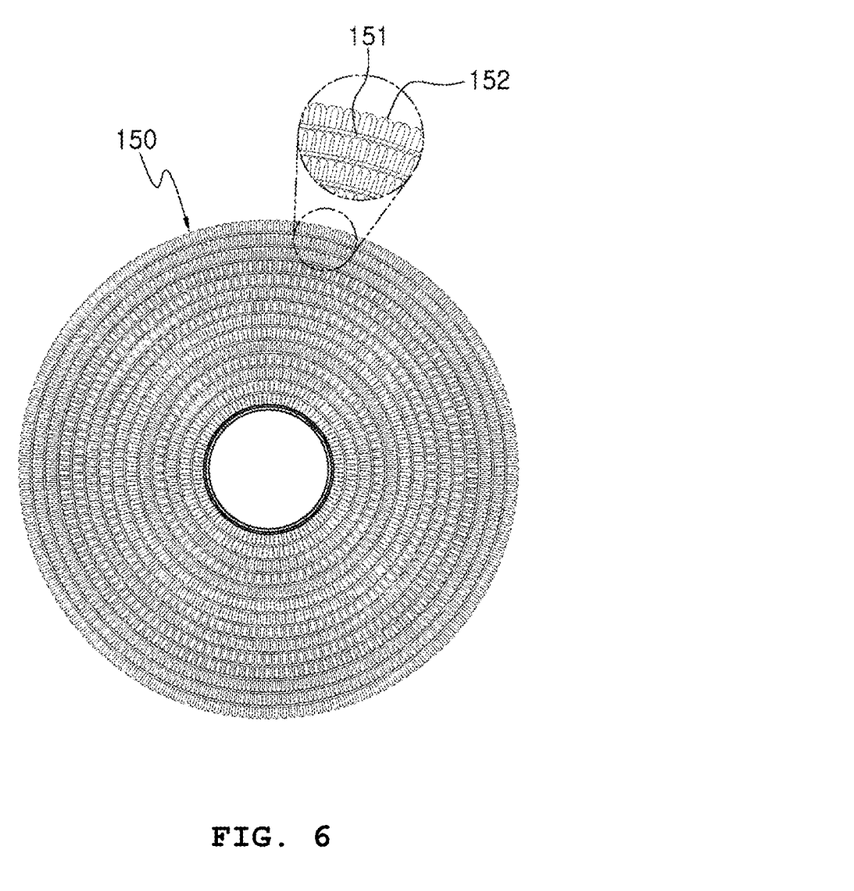
FIG. 6 is a plan view illustrating a stereoscopic filter having a prism shape.
Figure 7:
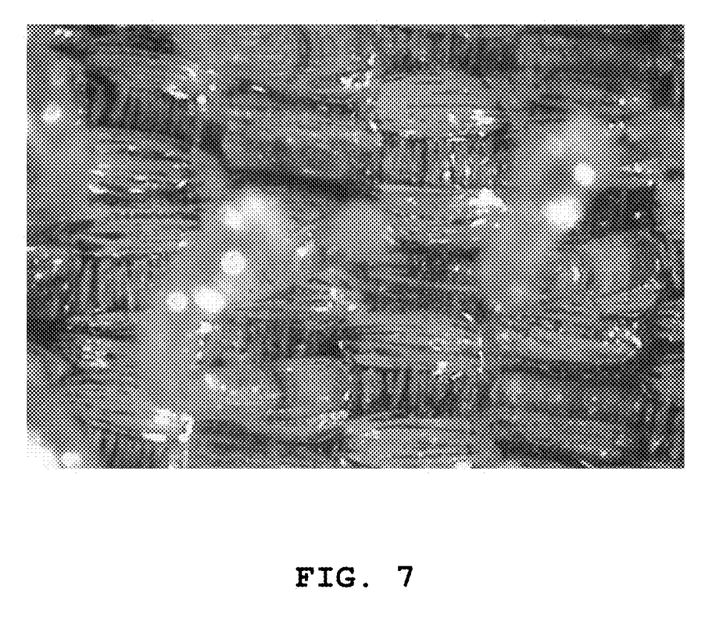
FIG. 7 is a photograph that illustrates a surface structure of fabric according to a further embodiment of the present invention.

FIG. 3 is a plan view illustrating a filter member serving as a stereoscopic filter composed of one plate member, according to one embodiment of the present invention. FIG. 4 is a plan view illustrating a stereoscopic filter composed of a plurality of plate members, according to another embodiment of the present invention. FIG. 5 is a plan view illustrating a stereoscopic filter including ring-shaped wires. FIG. 6 is a plan view illustrating a stereoscopic filter having a prism shape. FIG. 7 is a photograph that illustrates a surface structure of fabric according to a further embodiment of the present invention.

The stereoscopic filter 150 includes a plate member 151 and a wire member 152.

The plate member 151 that is rolled up in many layers surrounds the stand tube 130. The layers of the plate member 151 are distanced from each other. The wire member 152 is formed in a side surface of the plate member 151 to secure a gap between the layers of the plate member 151.

The plate member 151 is formed by winding a long flat panel member around the stand tube 130 in the form of a scroll (see FIG. 3).

The layers of the plate member 151 that is rolled up in the form of a scroll are distanced from each other so that a fluid can flow through a gap between the layers of the plate member 151.

The plate member 151 may not be one plate member but be composed of a plurality of plate members 151 that has a cylinder shape and is arranged to surround the stand tube 150.

In this case, the plate members 151 have different sizes. That is, a relatively smaller cylinder-shaped plate member 151 is arranged inside a relatively larger cylinder-shaped plate member 151. By arranging, in this way, the plate members 151 having different sizes, it is possible to surround the stand tube 130 with many layers of the plate member 151 (see FIG. 4).

Alternatively, the plate member 151 may have a prism shape instead of a cylinder shape (see FIG. 5).

The wire member 152 is formed on a side surface of the plate member 151, and the wire member 152 and the plate member 151 are integrated with each other to form a single body. The wire member 152 secures a gap between the layers of the plate member 152 so that a fluid can flow through the gap. In addition, an additional filter layer may be installed between the layers of the plate member 151, i.e., in the gap between the layers of the plate member 151.

The wire member 152 may include a plurality of wire members and may be provided to one side surface or respective side surfaces of the plate member 151.

The wire member 152 may have a hook shape (see FIGS. 3 and 4). When the hook-shaped wire members 152 are engaged with each other and installed in the gap between the layers of the plate member 151, a cluster of the engaged wire members 152 may form a filter layer with a plurality of filter meshes, thereby improving impurity removal efficiency.

The wire member 152 may have a ring shape (see FIG. 6). In this case, by arranging a cluster of the ring-shaped wire members 152 coupled to each other between the layers of the plate member 151, it is possible to form a filter layer with a plurality of filter meshes between the layers of the plate member 151.

In the stereoscopic filter 150 composed of the plate member 151 and the wire member 152, when the plate member 152 has surface unevenness or a grid surface, impurity adsorption efficiency is increased. The grid surface of the plate member 151 may be formed when the plate member 151 is made of woven cloth (i.e. fabric) in which warp and weft threads cross each other. This can increase the impurity removal efficiency.

The fabric in which warp and weft threads are woven with each other is a porous medium with a plurality of pores. Therefore, when the plate member 152 is made of fabric, it is possible to increase impurity adsorption efficiency, thereby improving impurity removal efficiency.

In addition, the plate member 151 is vertically arranged in parallel with the shaft 120 to allow the fluid, which is sprayed to the upper end of the rotor 140, to easily flow down to the lower end of the rotor 140. With this arrangement, the plate member 151 directly faces the impurities removed from the fluid by centrifugal force.

The stereoscopic filter which is composed of the plate member 151 and the wire member 152 may be easily installed since it takes the form of VELCRO™ fastener.

That is, a hook surface or a loop surface of a VELCRO™ fastener in which a plurality of hooks is formed is rolled up, the stereoscopic filter 130 shown in FIG. 5 can be easily formed.

The stereoscopic filter 150 according to the present invention is an expendable part that needs to be replaced after use for a predetermined period. The stereoscopic filter 150 is installed in a manner of being inserted between the rotor 140 and the stand tube 130. Preferably, the stereoscopic filter 150 is inserted between the rotor 140 and the stand tube 130 so as to be in tight pressure contact with the rotor 140 and the stand tube 130 so that it can rotate along with the rotor 140 and the stand tube 130.

The stereoscopic filter 150 according to the present invention can be used to filter out impurities in lubricating oil that is applied to an engine or other machinery by a pump. A specific filtration process is as follows.

A fluid that is introduced into the casing 110 through the inlet 111 by a pump flows to the stand tube 130 through the shaft 120, is then sprayed into the rotor 140 through the holes 131 formed in the stand tube 131, then disperses in the rotor 140, and finally drops to an upper end of the stereoscopic filter 150.

The fluid that drops to the upper end of the stereoscopic filter 150 flows down along the gap between the layers of the plate member 151 until it reaches the lower end of the rotor 140. While the fluid flows down to the lower end of the rotor 140, impurities are adsorbed onto the surface of the plate member 151 or stuck in meshes of the filter layer that is formed by the wire members 152.

As for impurities having a size of 10 μm or less, they cannot reach the inner surface of the rotor 140 and drops at around the stand tube 130 because they are nearly uninfluenced by centrifugal force. Conventional centrifugal filtration apparatuses cannot filter out impurities having a size of 10 μm or less because of this behavior of such impurities. However, the stereoscopic filter 150 according to the present invention can filter out even impurities having a size of 10 μm or less that cannot reach the inner surface of the rotor 140 but drop around the stand tube 130 because the stereoscopic filter 150 is arranged at uniform intervals between the stand tube 130 and the rotor 140.

As described above, the centrifugal filtration apparatus according to the present invention can increase impurity removal efficiency by increasing centrifugal force and contact area between the plate member 151 of the centrifugal filter 150 and impurities in a fluid. Furthermore, the filter layer formed by the wire members 152 of the stereoscopic filter 150 also increases impurity removal efficiency.

The centrifugal filtration apparatus according to the present invention is not only used to filter lubricating oil that is applied to an engine or other machinery as described above but also to filter a polluted fluid such as waste water, or a polluted gas.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A centrifugal filtration apparatus including a stereoscopic filter comprising:

a casing with an inlet and an outlet;

a shaft that is vertically installed in the casing and guides a fluid that is introduced through the inlet to an upper end of the shaft, wherein the fluid introduced to the upper end contains impurities therein;

a stand tube that is installed to rotate about the shaft and sprays the fluid that is guided to the upper end of the casing through the shaft;

a rotor that is installed in the casing to form a space to receive and filter out the impurities from the fluid sprayed from the stand tube while rotating along with the stand tube, the rotor being provided with a nozzle through which filtered fluid is sprayed into the casing, wherein the rotor rotates about the shaft such that a centrifugal force directed away from the shaft is exerted on the fluid that is sprayed into the space formed by the rotor; and a stereoscopic filter consisting of a plate member and a plurality of wire members, wherein the plate member is rolled up to form a scroll shape which has a plurality of layers distanced from each other, the plate member surrounding the stand tube and installed in the rotor, wherein the wire members are formed in a side surface of the plate member to secure a gap between the layers of the plate member, thereby allowing the fluid to flow through the gap, the wire members forming a first filter layer to filter out the impurities from the fluid by coming into contact with the impurities in the fluid that flows between the layers of the plate member, and the plate member forming a second filter layer to adsorb the impurities onto a surface of the plate member, wherein flowing of the fluid and filtering of the impurities are both performed within a space which extends from one layer to another layer of two adjacent layers of the plate member, such that the impurities in the fluid, while the fluid flows between the two adjacent layers, are filtered out by the wire members disposed in the space between the two adjacent layers and the impurities are also adsorbed onto surfaces of the two adjacent layers which face the same space, wherein the wire members have a hook shape or a ring shape and are engaged with each other or coupled to each other, to form the first filter layer having a plurality of filter meshes in which the impurities are stuck, wherein the impurities are removed from the fluid by the centrifugal force, and the impurities stuck in the filter meshes of wire members and adsorbed on the surface of the plate member do not flow out of the stereoscopic filter;

wherein the stereoscopic filter filters out the impurities from the fluid, such that the impurities stuck in the wire members and adsorbed on the plate member remain within the stereoscopic filter without flowing out of the stereoscopic filter, while the fluid from which the impurities are filtered out flows out of the stereoscopic filter;

wherein the stand tube has a plurality of holes in an upper end portion thereof;

wherein the rotor has a sidewall and a cover which covers and comes in contact with an upper end of the sidewall;

wherein an inner surface of the sidewall of the rotor has a contact region that comes in direct contact with the stereoscopic filter, and an upper end of the contact region is disposed at a level lower than a level at which each of the holes is disposed;

wherein a channel is formed between an outer circumference of the shaft and an inner circumference of the stand tube, the channel is connected to the plurality of holes, and an uppermost part of the channel is disposed at a level higher than a level at which the upper end of the sidewall of the rotor comes in contact with the cover, wherein the holes of the stand tube has a first end connected to the channel and a second end connected to the space of the rotor, a depth of the holes is identical to a thickness of a sidewall of the stand tube, and the second end of the holes is directly connected to the space of the rotor without being elongated by any elongated hole, and wherein a portion of an outer circumference of the stand tube, which extends from the holes to a level at which a bottom of the stereoscopic filter is disposed, has a linear shape without being stepped and is covered by only the stereoscopic filter.

2. The centrifugal filtration apparatus including the stereoscopic filter according to claim 1, wherein the plate member is made of fabric in which warp and weft threads cross each other and is a porous medium having a plurality of pores.

3. The centrifugal filtration apparatus including the stereoscopic filter according to claim 1, wherein the plate member is formed to be parallel with the shaft.

4. The centrifugal filtration apparatus including the stereoscopic filter according to claim 1, wherein the stereoscopic filter takes the form of a rolled-up fastener that has a hook surface or a loop surface.

5. The centrifugal filtration apparatus including the stereoscopic filter according to claim 1, wherein the stereoscopic filter is inserted between the rotor and the stand tube so as to rotate along with the rotor.

6. The centrifugal filtration apparatus including the stereoscopic filter according to claim 1, wherein the wire members are formed on and in contact with said one layer of the two adjacent layers, and the wire members extend toward said another layer of the two adjacent layers to come in contact with said another layer, and further extends in a direction back to said one layer, forming the hook shape or the ring shape.

* * * * *